Aug. 19, 1947.                    Q. R. WALD                    2,426,130
                                  ROTOR BLADE
                              Filed Dec. 12, 1944
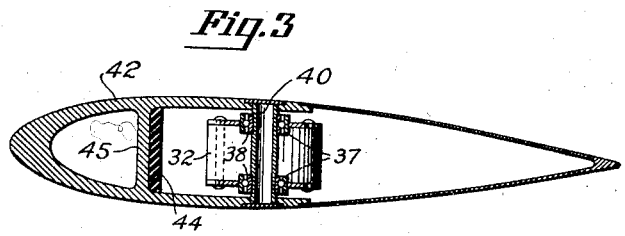
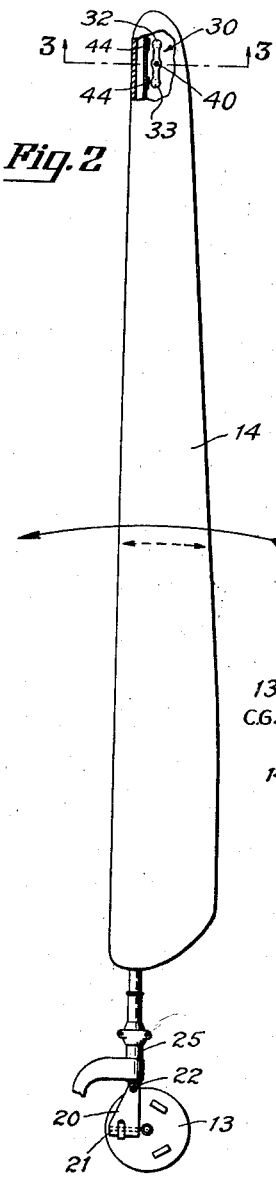
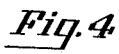
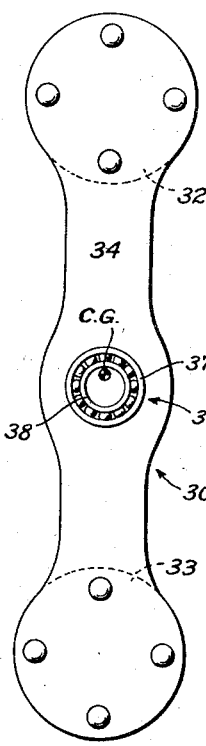
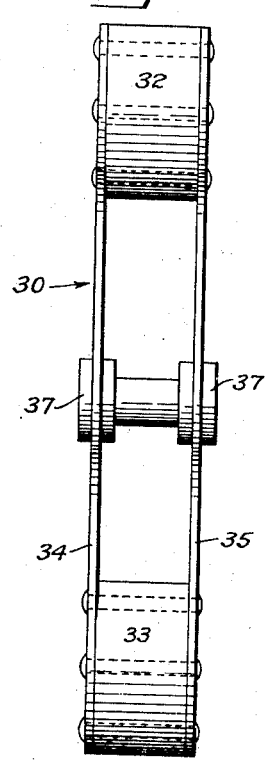
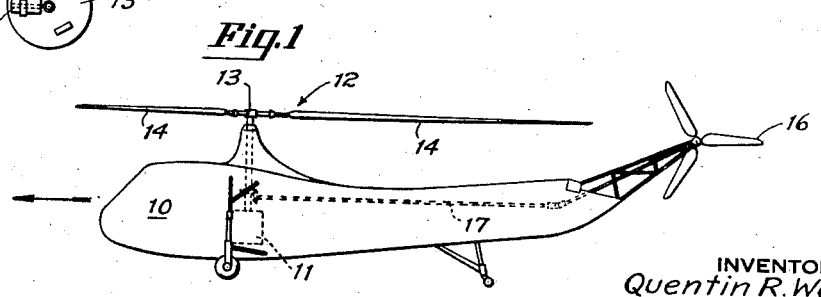
INVENTOR
Quentin R. Wald
BY
AGENT Patented Aug. 19, 1947

2,426,130

UNITED STATES PATENT OFFICE 2,426,130

ROTOR BLADE

Quentin R. Wald, Stratford, Conn., assignor to United Aircraft Corporation, East Hartford, Conn., a corporation of Delaware Application December 12, 1944, Serial No. 567,842

8 Claims. (Cl. 170—159)

The present invention relates to vibration dampers, and more particularly to damping means for inhibiting vibrations in aircraft rotor blades.

In helicopter aircraft it has been found advantageous to universally hinge the rotor blades at their root ends so that undue stress will not be placed upon the blades due to accelerations and decelerations, to provide automatic cyclic pitch and coming of the path of rotation of the rotor blades, and also to eliminate the effect upon the aircraft of transverse moments caused by gyroscopic action and by translation of the rotor in the air that would tend to upset the aircraft if the rotor blades were not so hinged.

However, when the rotor blades are hinged, it has been found that as an adjunct to the desirable automatic pitch action of the rotor blades there is an action some times called "hunting" which is a lagging and leading of a rotor blade in its path of revolution that occurs as a result of changes in drag between advancing and retreating blades of the rotor assembly, gusts of wind, accelerations due to tilting the rotor, aircraft vibration, etc.

An undesirable feature of the "hunting" action mentioned above is that a dynamic unbalance results in the rotor assembly which causes vibrations to be sent to the drive shaft of the aircraft, which vibrations may become dangerous under certain conditions, and which cause undue wear of operating parts as well as discomfort to passengers.

Therefore, it is an object of the present invention to provide means for inhibiting the "hunting" action while permitting the other desirable actions of a rotor blade to take place.

It is a further object of the present invention to provide a novel damping means substantially in the form of a compound pendulum which will act upon occurrence of vibration to resist the same with its inertia plus a dynamic component of inertia of a period determined by the period of vibration of the damped device and the period of vibration of the damping means.

Another object is to provide an improved damper of low period and compact design for damping machine elements having vibrations, or a vibration having more than one component of vibration, which can damp one vibration or component more than another.

Other objects and advantages of the present system will be apparent in the accompanying specification and claims, taken in view of the drawings, in which:

Fig. 1 is a side elevation of a helicopter,

Fig. 2 is a plan view of a rotor for a helicopter,

Fig. 3 is a section taken on the lines 3—3 of Fig. 2,

Figs. 4 and 5 are detailed views of the damping member, and

Fig. 6 is a diagrammatic view of a modification.

Referring first to Fig. 1, the helicopter comprises a body 10 having an engine 11 therein for driving the sustaining rotor generally indicated by reference character 12. The rotor comprises a hub 13 and one or more blades 14. The engine 11 also drives a torque compensating rotor 16 by means of a shaft 17.

In Fig. 2, the rotor blade 14 is shown as mounted on the hub 13 by a universal link 20 having a horizontal pivot 21, and a vertical pivot 22 connecting the link 20 to the shaft 25.

If the blade rotates in the direction of the solid line arrow, the "hunting" action will take place relative to the periodical rotating motion in a manner indicated by the dotted arrow beneath the solid line arrow.

Means for inhibiting this "hunting" action is shown as mounted in the rotor blade 14 near the tip thereof. It will be understood, of course, as the description proceeds that this means could be mounted at another part of the rotor or on associated structure for accomplishing the purpose to be described. For instance, it could be mounted closer to the inboard end of the blade, or upon any other part connected rigidly to the blade, for example, a blade counterweight, or the like.

The damping mechanism is generally indicated by the reference character 30 and comprises an enlongated weight member having masses 32 and 33 secured to side plates 34 and 35. A pivot 36 is made up of outer ball races 37 and inner ball races 38 that may receive a pin 40 for securing the damping member 30 to the leading edge structural member 42 of the rotor blade 14. Cushioning pads 44 are secured to a longitudinal web 45 of the rotor 14 to arrest the motion of the damping member 30 if it exceeds a given range of movement.

Referring now, more in detail, to Figs. 4 and 5, the damping member 30 has its weights 32 and 33 so arranged with the pivot means 36 that the center of gravity (CG) of the member 30 is not in registry with the center of rotation of the member 30. Thus, when the member 30 is moved bodily in a direction so that the member may pivot around its pivot means 36 the period of oscillation of the member 30 will bear a definite relation to the distance from the center of rotation to the center of mass, and inertia of the device. It will be understood that for different structures requiring different periods, the weights 32 and 33 may be of suitable size or of suitable material so that the center of gravity will be at the desired distance away from the center of rotation for the particular application of the device; or the spacing thereof with respect to the pivot 36 could be changed.

In operation, as the rotor 14 oscillates or hunts back and forth within its path as it rotates, the damping member 30 will act in an out of phase relationship to this oscillation. With a suitably selected period of oscillation for the damping means 30 the rotor blade 14 may be either highly damped or only slightly damped as desired. As the blade lags, the damping means 30 will oscillate so that the center of gravity will move forwardly to oppose the rearward motion of the rotor blade 14. As the rotor blade 14 begins to catch up, the damping means 30 may then be in its opposite phase of oscillation to likewise resist that motion. Thus for the complete oscillation the damping means 30 will resist the motion by its inertia and also resist this relative motion because of this dynamic characteristic. In other words, the damping means 30 constitutes a semi-lively mass located adjacent the tip of the rotor blade in the modification shown and described.

In adaptations of my invention to different rotor blades, and to other vibrating mechanisms to be damped, it may be found desirable to damp different components of movement with different degrees of dynamic and inertia damping. In the modification described above, the movement of the rotor blade in "hunting" and flapping up and down will in fact be a composite function of these actions and will have a resultant movement at an angle to the center line of the pivot 40. Hence each motion will receive an amount of dynamic and inertia damping depending upon this angle. To vary the amount received by each component of movement it is only necessary to vary the angle of rotation of the damper by tilting the pivot.

If it is desired to resist this resultant movement only, the damper could be mounted in a cardan or ball joint. As shown in Fig. 6, the weights 132 and 133 are connected by a bar 134. A pair of angularly displaced pivot rods 140 and 142 are connected to a ring 144 to provide freedom of movement for the damper. The rod 140 can be mounted to the member to be damped. With such an arrangement the damper will operate to damp oscillations of the member by exerting inertia as well as dynamic forces no matter what the resultant of the "flapping" and the "hunting" movements of the member.

It is obvious that the same action could be obtained within the teachings of my invention by placing the damping means at different places in the rotor blade or in additional connected structude. For this reason I wish not to be limited only to the forms of my invention shown and described but by the spirit and the scope of the appended claims.

I claim:

1. In a rotor blade driven in a closed path of rotation from a source of power, a sustaining portion having tip and root ends, a universal connection between the root end and the source of power whereby the blade can move in a first direction up and down in said path of rotation and in a second direction back and forth substantially within said path, and a structural member extending lengthwise of said rotor, damping means adjacent the tip end of the sustaining portion for restraining the freedom of movement in one of said directions more than in the other of said directions comprising in combination; a pin secured to said structural member, an elongated damping member having a pair of weights at its ends and a hole between its ends, the hole being arranged with respect to the weights so that the center of gravity of said damping member is not in registry with the center of the hole, anti-friction bearing means, said damping member being mounted on said pin by the bearing means and free to rotate in the second direction but not in the first direction, whereby the inertia only of the damping member resists movement in the first direction, but the inertia plus a dynamic component of the inertia of a frequency determined by the period of vibration of said rotor and by the frequency of said damping member determined by the offset of the center of gravity and the center of rotation of the damping member will resist motion in the second direction, and energy absorbing means arranged between the damping member and the structural member for absorbing energy when the damping member moves beyond a predetermined range of movement.

2. In a rotor blade driven in a closed path of rotation from a source of power, a sustaining portion having tip and root ends, a universal connection between the root end and the source of power whereby the blade can move in a first direction up and down in said path of rotation and in a second direction back and forth substantially within said path, and a structural member extending lengthwise of said rotor between its ends; damping means for restraining the freedom of movement in at least one of said directions comprising in combination, a pin secured to said structural member, an elongated damping member having a pair of weights at its ends and a hole between its ends, the hole being arranged with respect to the weights so that the center of gravity of said damping member is not in registry with the center of the hole, anti-friction bearing means, said damping member being mounted on said pin by the bearing means and free to rotate in the second direction but not in the first direction, whereby the inertia only of the damping member resists movement in the first direction, but the inertia plus a dynamic component of the inertia of a frequency determined by the period of vibration of said rotor and by the offset of the center of gravity and the center of rotation of the damping member will resist motion in the second direction.

3. In a rotor blade driven in a closed path of rotation from a source of power, a sustaining portion having tip and root ends, a universal connection between the root end and the source of power whereby the blade can move in a first direction upon and down in said path of rotation and in a second direction back and forth substantially within said path, and a structural member extending lengthwise of said rotor between its ends; damping means for restraining the freedom of movement in at least one of said directions comprising in combination, a pin secured to said structural member, an elongated damping member rotatably mounted on said pin and having a pair of weights at its ends and a hole between its ends, the hole being arranged with respect to the weights so that the center of gravity of said member is not in registry with the hole, and energy absorbing means arranged between the damping member and the structural member for absorbing energy when the damping member moves beyond a predetermined range of movement.

4. In a rotor blade driven in a closed path of rotation from a source of power, a sustaining portion having tip and root ends, a universal connection between the root end and the source of power whereby the blade can move in a first direction up and down in said path of rotation and in a second direction back and forth substantially within said path, and a structural member extending lengthwise of said rotor between its ends; damping means for restraining the freedom of movement in at least one of said directions comprising in combination, a pin secured to said structural member, and an elongated damping member rotatably mounted on said pin and having a pair of weights at its ends and a hole between its ends, the hole being arranged with respect to the weights so that the center of gravity of said member is not in registry with the hole.

5. In a rotor blade mounted upon a pivot and movable in a path of rotation and subjected to conditions for causing vibrations both up and down in the path and back and forth substantially within the path; a vibration damper for said blade comprising, in combination, a damping member comprising a pair of rigidly connected weights having a center of mass and a center of rotation between said weights, center of mass and the center of rotation of said member being not in registry, pivot means connecting the damping member to the blade to cause it to rotate relatively freely in only one direction, in which direction said member will resist vibration with its mass plus a dynamic component of its mass as the damping member moves about its center of rotation, and means for limiting the movement of said damping member.

6. In a rotor blade mounted upon a pivot and movable in a path of rotation and subjected to conditions for causing vibrations both up and down in the path and back and forth substantially within the path; a vibration damper for said blade comprising, in combination, a damping member comprising a pair of weights having a center of mass and a center of rotation between the weights, the center of mass and the center of rotation of said member being not in registry, and pivot means connecting the damping member to the blade to cause it to rotate relatively freely in one direction, in which direction said member will resist vibration with its mass plus a dynamic component of its mass as the damping member moves about its center of rotation.

7. In a rotor blade mounted upon a pivot and movable in a path of rotation and subjected to conditions for causing vibrations both up and down in the path and back and forth substantially within the path; a vibration damper for said blade comprising, in combination, a damping member having a center of mass and a center of rotation within its outlines, the center of mass and the center of rotation of said member being not in registry, and pivot means connecting the damping member to the blade to cause it to rotate relatively freely in one direction, in which direction said member will resist vibration with its mass plus a dynamic component of its mass as the damping member moves about its center of rotation.

8. In a rotor blade mounted upon a pivot and movable in a path of rotation and subjected to conditions for causing vibrations both up and down in the path and back and forth substantially within the path; a vibration damper for said blade comprising, in combination, a damping member having a center of mass and a center of rotation within its outlines, and pivot means eccentric with respect to the center of mass, connecting the damping member to the blade to cause it to rotate relatively freely in one direction but eccentrically around its center of mass, whereby said member will resist vibration with its mass plus a dynamic component of its mass as the damping member moves about its center of rotation.

QUENTIN R. WALD.

REFERENCES CITED

The following references are of record in the file of this patent:

UNITED STATES PATENTS

| Number | Name | Date |
| --- | --- | --- |
| Re. 21,022 | A. J. Bocz | Mar. 7, 1939 |
| 2,225,098 | Chilton | Dec. 17, 1940 |
| 2,048,326 | Dyer et al. | July 21, 1936 |
| 2,379,255 | Rubissow | June 26, 1945 |

FOREIGN PATENTS

| Number | Country | Date |
| --- | --- | --- |
| 401,962 | Great Britain | Nov. 23, 1933 |
| 335,056 | Germany | Apr. 28, 1921 |
| 436,981 | Great Britain | Oct. 22, 1935 |